United States Patent [19]

Cameron et al.

[11] Patent Number: 4,907,669
[45] Date of Patent: Mar. 13, 1990

[54] FRONT AXLE FOR AN ALL-WHEEL DRIVE VEHICLE

[75] Inventors: Dugald Cameron, Grosse Pointe Woods, Mich.; Karl Friedrich, Leibnitz, Austria

[73] Assignee: Chrysler Motors Corporation, Highland Park, Mich.

[21] Appl. No.: 266,434

[22] Filed: Nov. 2, 1988

[30] Foreign Application Priority Data

Dec. 15, 1987 [AT] Austria ................... 3297/87

[51] Int. Cl.4 ............................................ B60K 17/34
[52] U.S. Cl. ...................................... 180/248; 277/59
[58] Field of Search ............ 180/233, 247, 248, 249, 180/250; 384/551, 484; 277/59

[56] References Cited

U.S. PATENT DOCUMENTS 3,658,395  4/1972  Hallorback .................. 384/484
4,582,160  4/1986  Weismann et al. ............. 180/250
4,601,359  7/1986  Weismann et al. ............. 180/233
4,763,749  8/1988  Miura et al. .................. 180/249

Primary Examiner—David M. Mitchell
Attorney, Agent, or Firm—Edward P. Barthel

[57] ABSTRACT

A front transaxle for an all-wheel drive motor vehicle wherein the housing of an interaxle differential is operatively connected to a shiftable transmission and, via a tubular shaft, drives one bevel gear of an angle drive. The other angle drive bevel gear is operatively connected to a longitudinal propeller shaft for driving the rear axle. One front wheel drive shaft extends from the interaxle differential through the tubular shaft. The housing of the angle drive is connected by a flanged joint to the transmission outer housing. The arrangement permits the differential and angle drive subassemblies to be manufactured and tested at different locations while preventing the mixing of lubricants between the two subassemblies upon their assembly into the transaxle.

2 Claims, 2 Drawing Sheets

4,907,669

FRONT AXLE FOR AN ALL-WHEEL DRIVE VEHICLE

BACKGROUND OF THE INVENTION

This invention relates to a front wheel transaxle for an all-wheel drive motor vehicle and more particularly to an improved arrangement therefore wherein two subassemblies are provided that upon incorporation in the transaxle assembly obviate the mixing of lubricants.

The U.S. Pat. Nos. 4,582,160 and 4,601,359 together with the European Patent Office publication (EPO 198 812 A3) are examples of prior art front wheel drive transaxles adapted for four-wheel drive vehicles. In such transaxles the axle differential, including its outer housing, often comprises the housing of the shiftable transmission, on the one hand, and the angle drive, including its housing, on the other hand. The axle differential with its housing and the shiftable transmission with its housing are designed to be made as separate subassemblies in different plants. This necessitates that each subassembly be tested with its compatible lubricant introduced prior to its assembly into the transaxle. Such testing previously involved considerable difficulty because of the lack of separate seals for each subassembly. Further, a particular kind of lubricant is usually required for both the differential and the shiftable transmission while a different kind of lubricant is required for the angle drive mechanism. It is also a concern to insure that in the event of damage or failure of one of the assembly seals a mixing of the two different lubricants be prevented.

SUMMARY OF THE INVENTION

It is an object of the present invention to provide an improved front transaxle for a four-wheel drive vehicle wherein a unique fabrication arrangement allows a differential and shifting transmission subassembly and an angle drive subassembly to be manufactured and readily tested in different plants while obviating the mixing of the different lubricants required for each subassembly.

The front wheel drive transaxle for an all-wheel drive motor vehicle comprises a differential housing operatively connected to a shiftable transmission. A transversely extending tubular shaft has its inboard end connected to the interaxle differential housing while its outboard end drives the input bevel gear of an angle drive. The output bevel gear of the angle drive is operatively connected to the forward end of the vehicle longitudinal propeller drive shaft. The propeller drive shaft aft end is operatively connected to the rear axle differential. One wheel drive shaft extends through the tubular shaft and has its inboard end connected to one side gear of the front transaxle interaxle differential. The housing of the angle drive is connected by a flange joint to the transmission and interaxle differential outer housing.

In accordance with the invention the outer housing and the angle drive housing are sealed against the tubular shaft adjacent to the flange joint by axially opposed first and second seals. The angle drive housing is sealed on one side opposite to the interaxle differential side by axially opposed third and forth seals against the tubular shaft and the adjacent left front wheel shaft respectively. A fifth seal is provided on the one side between the tubular shaft and the left front wheel shaft. A passage communicates with and extends downwardly and outwardly from a first chamber between the first and second opposed seals and a second chamber between the third and forth opposed seals.

Thus, two opposed seals are provided in each region in which a sealing is required and each of the associated chambers therebetween communicate with an outwardly directed passage. Because of this arrangement damage or failure of a seal that is associated with one of the transaxle housings will not permit oil to enter the adjacent remaining housing as any oil which leaks into the chambers will be drained through its associated outwardly extending passage. The arrangement further operates such that even lubricating oil which can seep from the axle differential along the adjacent wheel drive shaft through the tubular shaft will be retained by a seal and, in case of damage to a seal, will enter an interseal chamber. Further, as each interseal space is connected to a drain passage each interseal chamber will inherently be sealed from the interior of the angle drive housing. It will be understood that the seals which are provided will be sufficient for sealing of each of the two flange-connected transmission and angle drive housings. Thus, the two subassemblies can be separately manufactured and readily tested upon being filled with lubricant.

BRIEF DESCRIPTION OF THE DRAWINGS

These and other objects, features and advantages of the invention will appear from the following written description and the accompanying drawings in which.

DETAILED DESCRIPTION OF THE INVENTION

Figure 1:
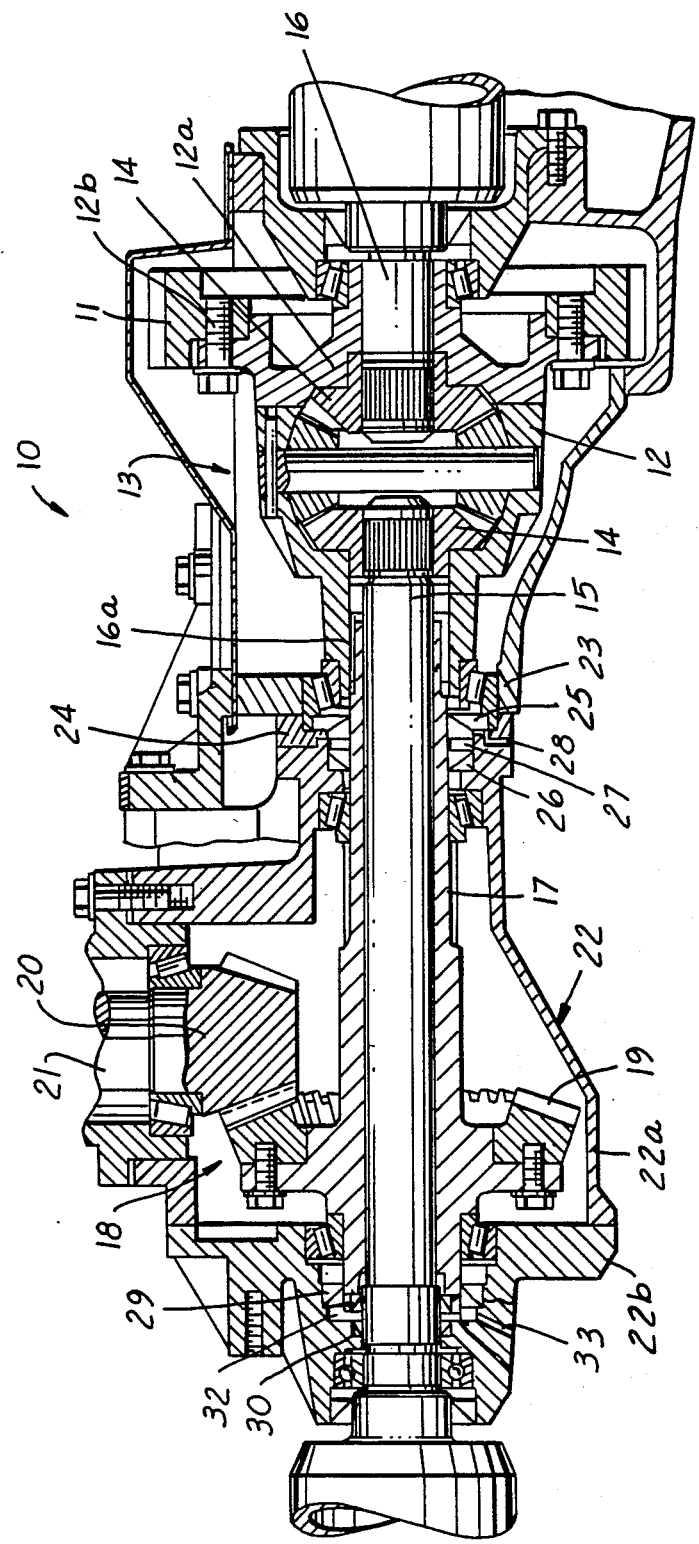
FIG. 1 is an axial sectional view showing those parts of a front axle drive which are essential for the invention.

Referring now to the drawings and in particular to FIG. 1 an output spur gear of a motor vehicle transaxle shiftable transmission is shown at 10. Reference may be had to the above mentioned U. S. Pat. No. 4,601,359; issued July. 22, 1986, to Weismann et al. for a description of a vehicle transaxle suitable for use with the present invention the disclosure of which is incorporated by reference herein.

The transmission output spur gear 11 is fixedly secured to an end portion 12a an interaxle differential housing 12 by means of bolts 12b. The interaxle differential, generally indicated at 13, has its large left and right side bevel gears 14 secured to first or left 15 and second or right 16 front wheel drive shafts of the transaxle. The interaxle differential housing 12 is non-rotatably connected by means of splines 16a to the inboard or one end of a hollow tubular shaft 17 which concentrically surrounds the first wheel drive shaft 15.

An angle drive, generally indicated at 18, comprises an input bevel gear 19, shown secured to the outboard or other end of the tubular shaft 17, and an output bevel gear 20. The output bevel gear 20 is secured to a longitudinally extending propeller shaft 21 of interaxle drive means for transmitting power to another axle of the vehicle, such as a rear axle shown in the mentioned Weismann et al. patent. The angle drive 18 is accommodated in an angle drive housing 22, which is secured to an outer or transmission housing 23 of the transaxle differential 13 by a flange-mounted or flanged joint comprising an interposed ring 24.

Figure 2:
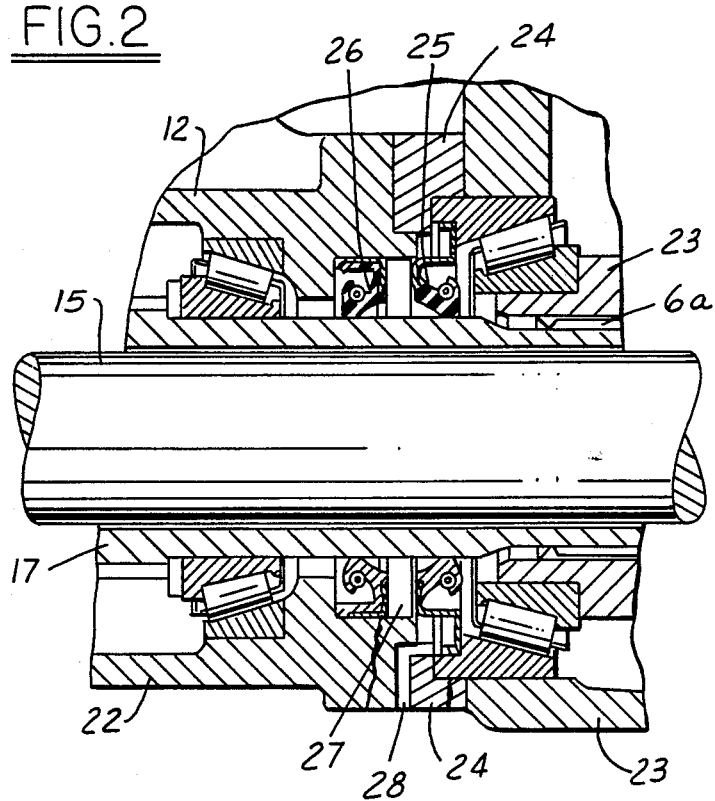
FIG. 2 is an enlarged view showing as a detail the joint between the transmission outer housing enclosing the interaxle differential and the angle drive housing.

With reference to FIG. 2 it will be seen that on a first or right hand side of the angle drive housing 22 the outer transmission housing 23 and the angle drive housing 22 are sealed against the tubular shaft 17 adjacent to the flange joint interposed ring 24 by first 25 and second 26 spring loaded bonded metal case radial seals. The seals 25 and 26 are axially opposed or spaced apart so as to define between them a first interseal chamber 27. The chamber 27 communicates with a first drain passage 28, which extends outwardly and downwardly from the chamber 27.

Figure 3:
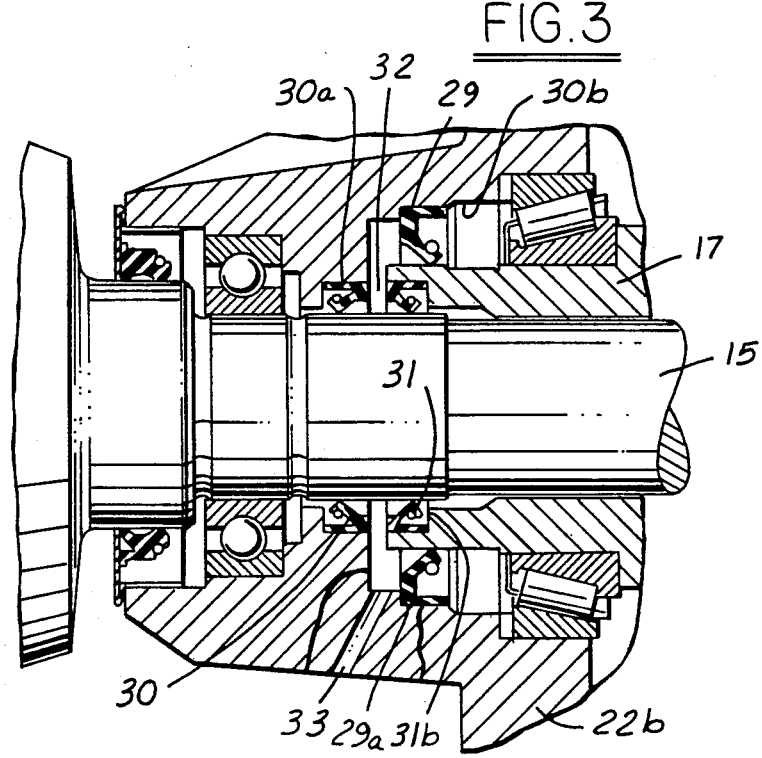
FIG. 3 shows another detail comprising the seals provided on that side of the angle drive which is opposite to the interaxle differential.

As seen in FIGS. 1 and 3 the tubular shaft 17 and the first wheel shaft 15 extend through the angle drive housing 22, comprising axial portion 22a and end portion 22b fixed thereto. It will be noted that the left hand end portion 22b is located transversely opposite to the angle drive housing first or right hand differential end of the transaxle. The angle drive housing left hand portion 22b incorporates sealing means in the form of a third oil seal 29 in circumscribing sealing contact with the outer surface of the tubular shaft 17.

As seen in FIG. 3 the third seal 29 is in the form of a positive contact spring loaded radial seal located adjacent its left hand end of the tubular shaft. The third seal 29 is seated in a internal shoulder 29a of an inboard facing stepped counterbore of the angle drive housing portion 22b.

With reference again to FIG. 3 a fourth oil seal 30 is also in the form of a positive contact spring loaded radial seal and is shown in sealing contact with the outer surface of the first wheel drive shaft 15. The fourth oil seal 30 is seated in a reduced diameter internal shoulder 30a of inboard facing stepped counterbore 30b formed in the angle drive housing portion 22b. A fifth oil seal 31 is seated in an axial counterbore 31a formed in the left hand or outboard end of the tubular shaft 17. The fifth oil seal 31 is in the form of a spring loaded radial seal shown in FIG. 3 in positive contact with the outer surface of the first wheel shaft 15. The fourth 30 and fifth 31 oil seals, which are in sealing contact with the first wheel drive shaft 15, are axially spaced apart so as to define between them a second interseal chamber 32. The second interseal chamber 32 communicates with a second radial drain passage 33 formed in the angle drive housing portion 12b and extends outwardly and downwardly from the chamber 32.

While the principles of the present invention in connection with the specific axle has been described, it is to be understood the foregoing detailed description has been made by way of example only and not as a limitation to the scope of the invention as set for in the accompanying claims. For example, it will be understood that the interaxle differential need not consist of a bevel gear differential but may alternatively consists of a planetary spur gear train having a planet carrier, which in that case will be equivalent to a differential gear housing for the purposes of the present invention.

What is claimed is:

1. In a front axle drive for an all-wheel drive motor vehicle, comprising:

first and second wheel drive shafts;

an axle differential coupled to said wheel drive shafts having an input member consisting of a differential housing;

an angle drive having input and output bevel gears;

interaxle drive means non-rotatably connected to said output bevel gear;

a tubular shaft surrounding said first wheel drive shaft and non-rotatably connecting said differential housing to said input bevel gear;

a transmission outer housing containing said differential housing; and an angle drive housing containing said angle drive and secured to said transmission outer housing by a flanged joint on a first side of said angle drive housing, the improvement comprising;

said transmission outer housing and said angle drive housing being sealed against said tubular shaft adjacent to said flanged joint by first and second oil seals, respectively, said first and second seals being axially spaced apart so as to define therebetween a first interseal chamber;

said tubular shaft and said first wheel drive shaft extending through said angle drive housing to a second side thereof opposite to said first side;

said angle drive housing being sealed on said second side against said tubular shaft by a third oil seal, and said angle drive housing being sealed on said second side against said first wheel drive shaft by a fourth oil seal;

a fifth oil seal disposed between said tubular shaft and said first wheel shaft on said second side of said angle drive housing;

said fourth and fifth oil seals being axially spaced apart so as to define therebetween a second interseal chamber; and means provided which define first and second drain passages which communicate with and extend outwardly and downwardly from said first and second interseal chambers, respectively.

2. The front axle drive for an all-wheel drive motor vehicle as set forth in claim 1, wherein said first drain passage is formed intermediate said angle drive housing and said flanged joint and said second drain passage being formed in said angle drive housing.

* * * * *